US006935674B1

(12) United States Patent
Campos

(10) Patent No.: US 6,935,674 B1
(45) Date of Patent: Aug. 30, 2005

(54) RETRACTABLE VEHICLE COVER

(76) Inventor: Victor Armijo Campos, 7535 Pioneer Blvd., Whittier, CA (US) 90606

( * ) Notice: Subject to any disclaimer, the term of this patent is extended or adjusted under 35 U.S.C. 154(b) by 5 days.

(21) Appl. No.: 10/822,043

(22) Filed: Apr. 9, 2004

Related U.S. Application Data

(60) Provisional application No. 60/461,507, filed on Apr. 9, 2003.

(51) Int. Cl.$^7$ .............................................. B60J 11/00
(52) U.S. Cl. ................. 296/98; 296/136.1; 296/136.12
(58) Field of Search ............................ 296/98, 136.1, 296/136.11, 136.12; 150/166

(56) References Cited

U.S. PATENT DOCUMENTS

| | | | |
|---|---|---|---|
| 3,050,075 A | 8/1962 | Pernhall | ........................ 135/5 |
| 4,684,165 A * | 8/1987 | Becker | .................. 296/136.12 |
| 4,929,016 A | 5/1990 | Kastanis | ..................... 296/136 |
| 5,762,393 A * | 6/1998 | Darmas, Sr. | ................. 296/98 |
| 6,012,759 A | 1/2000 | Adamek | ...................... 296/136 |
| 6,672,643 B1 * | 1/2004 | Brodskiy et al. | ............. 296/98 |

FOREIGN PATENT DOCUMENTS

| | | | | |
|---|---|---|---|---|
| DE | 3146169 A1 * | 5/1983 | | .................. 296/98 |
| FR | 2703956 A1 * | 10/1994 | | .................. 296/98 |
| GB | 2145385 A * | 3/1985 | | |

* cited by examiner

*Primary Examiner*—Jason Morrow
(74) *Attorney, Agent, or Firm*—Goldstein Law Offices, PC

(57) ABSTRACT

A retractable vehicle cover for protecting the outer surface of a vehicle. The retractable vehicle cover has a housing, which contains a front and a rear reel assembly. Each reel assembly has a spring-loaded reel and a protective sheet wound around the reel. The sheets are extended as needed for covering and protecting both the front end and the rear end of the vehicle. The housing has a plurality of rubber suction cups for selective attachment of the housing to the roof of the vehicle. The housing has two shaft mounting brackets, for holding and supporting two telescopically adjustable shafts. The shafts are selectively extendable horizontally, between the sides of the vehicle, one toward the front and the other towards the rear of the vehicle, to support the front and rear protective sheets at an elevated position above the upper surface of the vehicle.

5 Claims, 3 Drawing Sheets

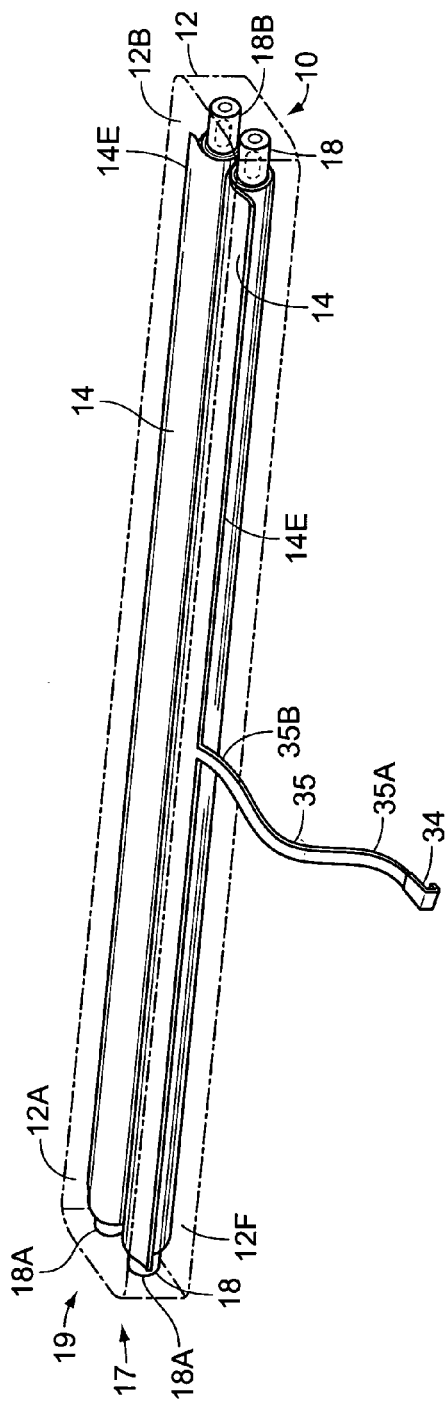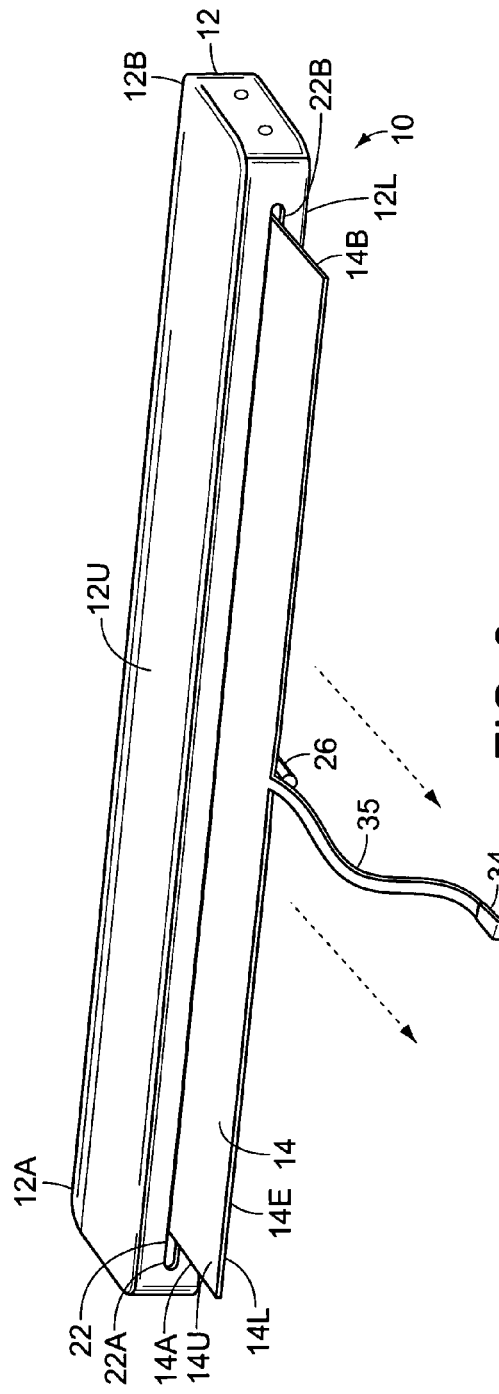

RETRACTABLE VEHICLE COVER

CROSS REFERENCES AND RELATED SUBJECT MATTER

This application is a continuation of provisional patent application Ser. No. 60/461,507, filed in the United States Patent Office on Apr. 9, 2003.

BACKGROUND OF THE INVENTION

1. Field of the Invention

The invention generally relates to a vehicle cover, and in particular it relates to a retractable vehicle cover which is selectively mounted to a roof of a vehicle.

2. Description of the Related Art

An outer surface of a vehicle will often become damaged when the vehicle is parked outdoors, by rain, sunlight, dirt, tree sap, bird droppings, and a great variety of other environmental factors. Various protective vehicle covers have been devised in an attempt to protect a vehicle from inclement environmental conditions. For example, U.S. Pat. No. 4,929,016 to Kastanis appears to show a vehicle cover comprised of a pair of selectively extendible sheets, horizontally mounted on the roof of a vehicle.

Additionally, U.S. Pat. No. 3,050,075 to Kaplan appears to show a vehicle cover comprised of a housing, adapted to be mounted on a vehicle roof, having a pair of retractable rolls.

Furthermore, U.S. Pat. No. 6,012,759 to Adamek appears to show a vehicle cover comprised of a roof mounted retractable reel, wherein the reel housing is selectively attachable to the roof by a magnet.

None of these devices appears to show a retractable vehicle cover having suction cups for selective attachment to a roof of an existing vehicle, also having selectively extendable tubular shafts for supporting a front protective sheet and a rear protective sheet in an elevated position above the upper surface of the vehicle.

While these units may be suitable for the particular purpose employed, or for general use, they would not be as suitable for the purposes of the present invention as disclosed hereafter.

SUMMARY OF THE INVENTION

It is an object of the invention to provide a retractable vehicle cover which protects the outer surface of a vehicle from harmful environmental factors such as rain, sunlight, dirt, tree sap, and bird droppings. Accordingly, the retractable vehicle cover mounts to the roof of a vehicle and has two selectively extendable sheets, one extendable forward and the other extendable rearward, for protection of the outer surface of the vehicle from such harmful environmental factors.

It is another object of the invention to provide a retractable vehicle cover which may be removed from the roof of the vehicle when not needed for protection of the vehicle. Accordingly, the retractable vehicle cover is equipped with suction cups which may be selectively attached to the roof of the vehicle, and which may be detached from the roof of the vehicle when the retractable vehicle cover is not needed.

It is yet another object of the invention to provide a retractable vehicle cover which is not unduly expensive. Accordingly, the retractable vehicle cover is constructed from inexpensive, readily available materials, and its cost is not prohibitive.

The invention is a retractable vehicle cover for protecting the outer surface of a vehicle. The retractable vehicle cover has a housing, which contains a front and a rear reel assembly. Each reel assembly has a spring-loaded reel and a protective sheet wound around the reel. The sheets are extended as needed for covering and protecting both the front end and the rear end of the vehicle. The housing has a plurality of rubber suction cups for selective attachment of the housing to the roof of the vehicle. The housing has two shaft mounting brackets, for holding and supporting two telescopically adjustable shafts. The shafts are selectively extendable horizontally, between the sides of the vehicle, one toward the front and the other towards the rear of the vehicle, to support the front and rear protective sheets at an elevated position above the upper surface of the vehicle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a perspective view of a retractable vehicle cover in its storage position, with portions of the housing shown by phantom lines, in order to reveal a front and rear reel assembly contained therein.

FIG. 2 is a perspective view of the retractable vehicle cover wherein a protective sheet for a front end of a vehicle has been partially extended from the housing.

DETAILED DESCRIPTION OF THE PREFERRED EMBODIMENTS

Figure 6:
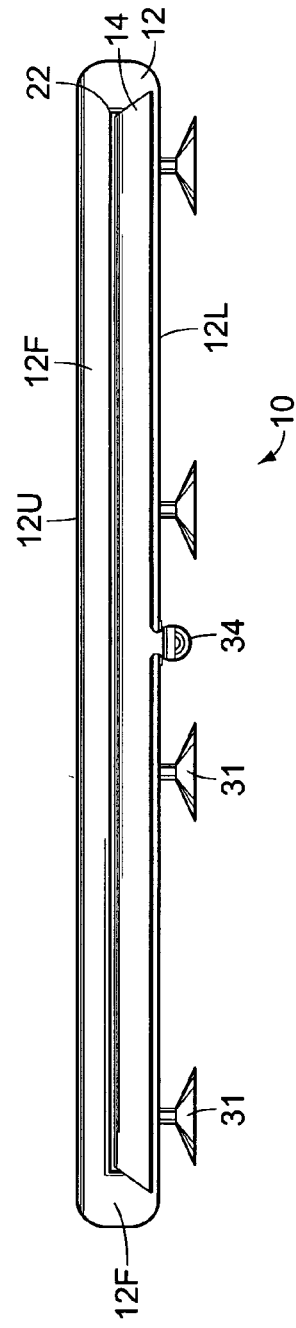
FIG. 6 is a front elevational view of the retractable vehicle cover.

FIG. 6 is a front elevational view of a retractable vehicle cover 10 having a housing 12 having a lower surface 12L. Rubber suction cups 31 are attached to the lower surface 12L for selective attachment of the housing 12 to a vehicle. FIG. 1 is a perspective view of the substantially hollow, substantially rectangular housing 12, with portions of the housing 12 in phantom lines in order to reveal a front reel assembly 17 and a rear reel assembly 19 contained therein. The retractable vehicle cover 10 has a storage position and a deployed position. Each reel assembly 17,19 has a reel 18 having a protective sheet 14 which is selectively wound around the reel 17,19 when the retractable vehicle cover 10 is in its storage position. Alternately, the sheets 14 are extended from the reel 17,19 to cover the vehicle, when the retractable vehicle cover 10 is in its deployed position, as will be described. The sheets 14 are preferably made of fine mesh nylon.

The housing 12 has a first side 12A, a second side 12B, a forward-facing surface 12F, a rearward-facing surface, a lower surface 12L, an upper surface 12U, a first side 12A and a second side 12B. The forward-facing surface 12F and the rearward-facing surface each have a substantially rectangular slotted opening 22 extending substantially between the first side 12A and the second side 12B of the housing 12, through which the protective sheets 14 selectively extend.

Each substantially flat protective sheet 14 has a leading edge 14E, an attached edge, a first side 14A, a second side 14B, an upper surface 14U, and a lower surface 14L. The attached edge of each sheet 14 is fastened to one of the reels 18. The leading edge 14E of each sheet 14 is selectively extended by a user through each of the slotted openings 22 when the retractable vehicle cover 10 is deployed to cover the upper surface 30U of a vehicle. The first side 14A of each sheet 14 extends substantially to the first side 12A of the housing 12. Similarly, the second side 14B of each sheet 14 extends substantially to the second side 12B of the housing 12. Each sheet 14 has an elasticized cord 35 having a first end 35A and a second end 35B, wherein the first end 35A is attached to the leading edge 14E of the sheet, midway between sides 14A and 14B, and wherein the second end 35B has an attached curved hook 34, for selectively engaging a portion of the vehicle when the sheets 14 are being deployed to cover the vehicle.

Figure 3:
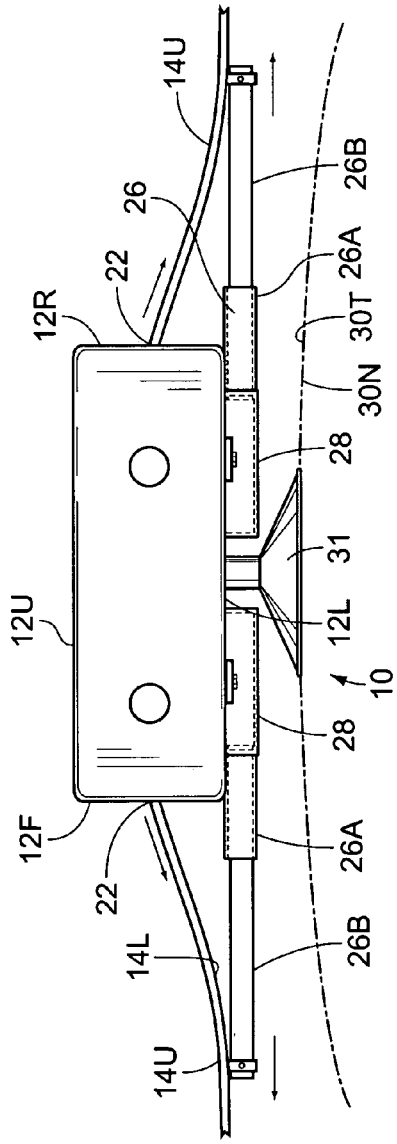
FIG. 3 is a side view of the retractable vehicle cover after it has been selectively attached to a roof of an existing vehicle by suction cups affixed to a lower surface of the housing.
Figure 4:
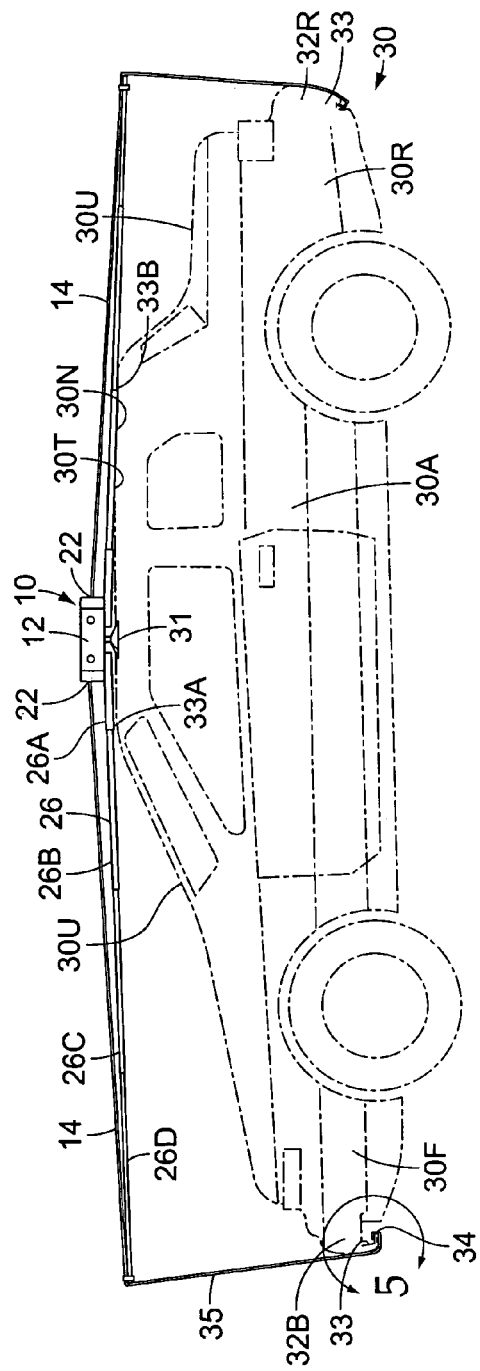
FIG. 4 is a side view of the retractable vehicle cover in its deployed position, wherein it is being used to cover the front end and a rear end of a vehicle.

Turning to FIG. 4, the retractable vehicle cover 10 has been selectively attached to an existing vehicle 30 having an upper surface 30U, a driver's side 30A, a passenger side, a front end 30F, and a rear end 30R. The vehicle 30 has a roof 30N having an upper surface 30T, and the retractable vehicle cover 10 is secured to the upper surface 30T of the roof 30N by its suction cups 31. The retractable vehicle cover 10 is shown in its deployed position. In particular, the protective sheets 14 have been unwound from their reels 17,19 and selectively extended through the slotted openings 22 on both the forward-facing surface 12F and the rearward-facing surface of the housing 12, in order to cover both the front end 30F and the rear end 30R of the vehicle 30. The retractable vehicle cover 10 has two mounting brackets 28 which house and support two telescopically adjustable shafts 26. These shafts 26 support the sheets 14 at an elevated position above the upper surface 30U of the vehicle 30, as will be described in the discussion of FIG. 3.

The front end 30F of the vehicle 30 has a front bumper 32B having a lower edge 33. Analogously, the rear end 30R of the vehicle 30 has a rear bumper 32R having a lower edge 33. When the retractable vehicle cover 10 is deployed, the hooks 34 on the cords 35 are used to selectively engage the lower edges 33 of the bumpers 32B and 32R, after the protective sheets 14 have been selectively extended from the front reel assembly 17 and the rear reel assembly 19.

Figure 5:
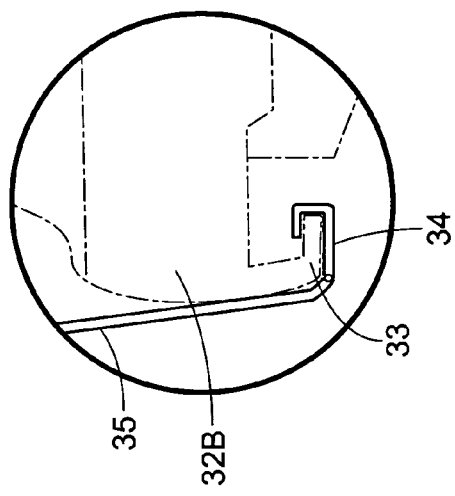
FIG. 5 is an enlarged side view taken generally in the area of circle 5 in FIG. 4, illustrating an elasticized cord and a hook being used to engage a front bumper of the vehicle.

FIG. 5 illustrates an enlarged side view taken generally in the area of circle 5 in FIG. 4, wherein the elasticized cord 35 and the curved hook 34 are being used to engage the lower edge 33 of the front bumper 32B of the vehicle 30.

Both the front and rear reel assemblies 17,19 are spring-loaded and have a coiled spring, which biases the reel assemblies 17,19 to the retracted position. As a consequence of the bias of the reel assemblies 17,19, a user is able to store the sheets 14 on their respective reels 17,19 by pulling the sheet 14 a short distance away from the reel 17 or 19, and then by releasing the sheet 14. Upon release, the coiled spring causes the sheet 14 to wind upon itself until it is fully retracted within the housing 12.

FIG. 2 illustrates a perspective view of the retractable vehicle cover 10 wherein the protective sheet 14 for the front end 30F of the vehicle 30 has been partially extended from the housing 12.

FIG. 3 illustrates an enlarged side view of the retractable vehicle cover 10 after it has been attached to the roof 30N of an existing vehicle 30. Here, the sheets 14 have been extended from the slotted openings 22. The housing 12 has two shaft mounting brackets 28 attached to its lower surface 12L. Each bracket 28 houses and supports a telescopically adjustable shaft 26. Each shaft 26 has a plurality of tubular segments which may be selectively horizontally extended away from one another in the deployed position, or retracted within one another in the storage position. In FIG. 3, the shafts 26 have been extended longitudinally beneath the sheets, and thereby support the sheets 14 at a position which is substantially elevated with respect to the upper surface 30U of the vehicle 30. One of the shafts 26 extends horizontally over the rear end 30R of the vehicle 30, substantially midway between the first side 30A and the opposed second side of the vehicle 30. The other shaft 26 extends horizontally over the front end 30F of the vehicle 30, also substantially midway between the first side 30A and the second side of the vehicle 30. The leading edge 14E of each sheet 14 optionally has a substantially rigid, transverse rod extending substantially from the first side 14A to the second side 14B of the sheet 14, for supporting the sheets 14 upon their underlying shafts 26 at an elevated position over the upper surface 30U of the vehicle 30, when the retractable vehicle cover 10 is in its deployed position. This feature allows the upper surface 30U of the vehicle 30 to be easily viewed even when it is protected by the sheets 14.

In use, the retractable vehicle cover 10 is placed upon the upper surface 30T of the roof 30N of the vehicle 30. The first end 12A of the housing 12 is positioned in proximity to the first side 30A of the vehicle 30, and the second end 12B is positioned in proximity to the second side of the vehicle 30. The roof 30N has a first end 33A closer to front end 30F of the vehicle and a second end 33B which is closer to the rear end 30R of the vehicle 30. The housing 12 is positioned on the roof 30N of the vehicle 30 at a location between the first end 33A of the roof 30N and the second end 33B of the roof 30N. The reels 18 each extend transversely, substantially from the first side 30A to the second side of the vehicle 30. After suitably positioning the housing 12 upon the roof 30N of the vehicle 30, the housing 12 is secured to the roof 30N, by gentle downward pressure by the user upon the housing 12, thereby creating a vacuum seal between the suction cups 31 and the roof 30N of the vehicle 30. The user then extends the sheets 14 from the front reel assembly 17 and the rear reel assembly 19 by pulling the sheets 14 by their hooks 34. After the sheets 14 have been so extended, they are tensioned and maintained in this extended position by engaging the hooks 34 with the lower edges 33 on the bumpers 32B,32R of the vehicle 30. When the retractable vehicle cover 10 is no longer needed, the sheets 14 are retracted into the housing 12. The retractable vehicle cover 10 may now be removed from the roof 30N of the vehicle 30, and stored until needed again.

In conclusion, herein is presented a retractable vehicle cover. The invention is illustrated by example in the drawing figures, and throughout the written description. It should be understood that numerous variations are possible, while adhering to the same basic concept. Such variations are contemplated as being a part of the present invention.

What is claimed is:

1. A retractable vehicle cover, for attaching to a vehicle having an upper surface, a roof, a front end, and a rear end, comprising:
   a housing having a first side, a second side, a forward facing surface, a rearward facing surface, and a lower surface, the forward facing surface and rearward facing surface each have a substantially rectangular slotted opening;
   a plurality of suction cups, for securing the housing to the roof of the vehicle;
   a pair of flexible sheets, for covering the vehicle by extending over the upper surface of the vehicle, one of the flexible sheets selectively extending forwardly from the slotted opening of the forward facing surface for extending to the front end of the vehicle, the other of the flexible sheets selectively extending rearwardly from the slotted opening of the rearward facing surface for extending to the rear end of the vehicle, both flexible sheets selectively retracting into the housing;
   a pair of shaft mounting brackets attached to the lower surface of the housing; and
   a pair of telescoping adjustable shafts, each supported by one of the shaft mounting brackets and each having a plurality of tubular segments which may be selectively horizontally extended longitudinally beneath the sheets for supporting the sheets at a position which is substantially elevated with respect to the upper surface of the vehicle.

2. The retractable vehicle cover as recited in claim 1, wherein each flexible sheet has a leading edge, and further comprises an elasticized cord having a first end and a second end, the first end attached to the leading edge, and the second end has a hook for engaging the vehicle.

3. The retractable vehicle cover as recited in claim 2, further comprising a pair of reel assemblies, each flexible sheet wound upon one of the reel assemblies.

4. A retractable vehicle cover, for attaching to a vehicle having an upper surface, a roof, a front end, and a rear end, comprising:
   a housing having a first side, a second side, a forward facing surface, a rearward facing surface, and a lower surface, the forward facing surface and rearward facing surface each have a substantially rectangular slotted opening;
   a plurality of suction cups, for securing the housing to the roof of the vehicle;
   a pair of reel assemblies, each reel assembly having a reel and a flexible sheet wound upon the reel, for covering the vehicle by extending the flexible sheet over the upper surface of the vehicle, one of the flexible sheets selectively extending forwardly from the slotted opening of the forward facing surface for extending to the front end of the vehicle, the other of the flexible sheets selectively extending rearwardly from the slotted opening of the rearward facing surface for extending to the rear end of the vehicle, both flexible sheets selectively retracting into the housing and winding upon the reel
   a pair of shaft mounting brackets attached to the lower surface of the housing; and
   a pair of telescoping adjustable shafts, each supported by one of the shaft mounting brackets and each having a plurality of tubular segments which may be selectively horizontally extended longitudinally beneath the sheets for supporting the sheets at a position which is substantially elevated with respect to the upper surface of the vehicle.

5. The retractable vehicle cover as recited in claim 4, wherein each flexible sheet has a leading edge, and further comprises an elasticized cord having a first end and a second end, the first end attached to the leading edge, and the second end has a hook for engaging the vehicle.

* * * * *